(No Model.)

M. N. BROUSE.
WATERING TROUGH.

No. 446,628. Patented Feb. 17, 1891.

Witnesses
H. J. Seitz
W. T. Duvall

Inventor
Martin N. Brouse
By his Attorneys,
C. A. Snow & Co.

UNITED STATES PATENT OFFICE.

MARTIN N. BROUSE, OF BILLINGSVILLE, INDIANA.

WATERING-TROUGH.

SPECIFICATION forming part of Letters Patent No. 446,628, dated February 17, 1891.

Application filed November 18, 1890. Serial No. 371,849. (No model.)

*To all whom it may concern:*

Be it known that I, MARTIN N. BROUSE, a citizen of the United States, residing at Billingsville, in the county of Union and State of Indiana, have invented a new and useful Watering-Trough, of which the following is a specification.

This invention has relation to watering-troughs for large and small cattle.

The objects of the invention are to provide a convenient place where large stock, as horses and cows, may drink, and a separate place where smaller stock or animals—such as pigs—may drink, and to provide means for automatically filling the receptacles and cutting off the supply when so filled.

Various other objects and advantages of the invention will appear in the following description, and the novel features thereof will be particularly pointed out in the claims.

Figure 1:
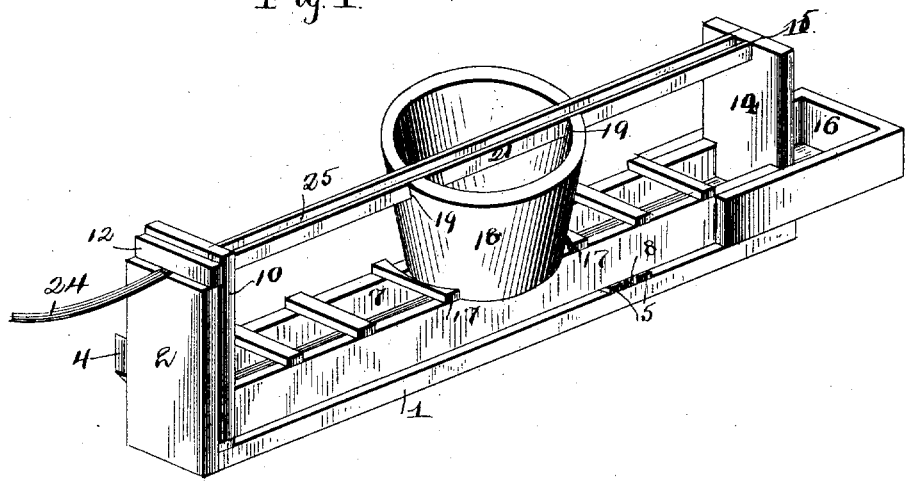
Figure 2:
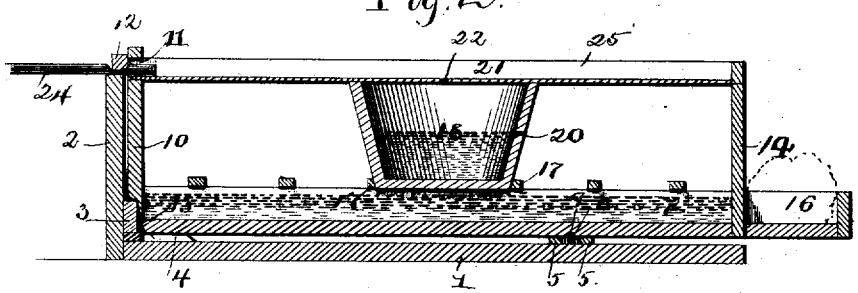

Referring to the drawings, Figure 1 is a perspective of a stock-trough constructed in accordance with my invention. Fig. 2 is a vertical longitudinal section.

Like numerals of reference indicate like parts in all the figures of the drawings.

1 designates the base, at the end of which is located a vertical end wall 2, which is provided at its juncture with the base with a guide-rib 3, and is braced by a diagonal brace 4. Near its opposite end the base is provided upon its upper side with a pair of transverse parallel ribs 5 spaced a slight distance apart, and located therein between is a pin 6 projecting upwardly a short distance above the base.

7 designates an ordinary trough, agreeing in length with the base and provided with the usual dividing transverse strips, whereby small stock is prevented from getting into the trough. The trough is provided upon its under side with a transverse fulcrum or bearing rib 8, designed to fit loosely between the ribs 5 of the base, and is provided with a small recess 9, which receives the upper end of the pin 6 of the base. At its rear end the trough is provided with a vertical end wall 10, provided near its upper end with an opening 11, and upon its outer side above the opening with a transversely-disposed beveled cleat 12, which projects above the upper end of the end wall 2 of the base. The lower end of the end wall 10 of the trough is provided with a recess 13, which receives the short vertical guide-rib 3 of the base, and thus said trough is guided when raised or lowered at that end. The trough is also provided with an opposite end wall 14, having a recess 15 in its upper end, and at this end of the trough is located a weight-supporting frame or box 16.

Upon the upper edges of the trough at each side of its center is located a channeled or curved rib 17, and between the same is seated a tank 18. At diametrically-opposite sides the tank is provided with cut-out portions or recesses, and below one of the same and toward the longer end of the fulcrumed trough there is formed in the wall of the tank a perforation 20. Seated in the recesses 19 is a rail 21, the ends of which enter the openings 15 and 11 in the end walls of the trough 7. The upper side of the rail is channeled or grooved longitudinally, as at 21, to form a water-conductor 25, and a perforation 22 in the bottom of the trough communicates with the tank 18.

In practice a barrel 23 of water is skidded or drawn upon a sled to the trough and a flexible hose 24 led from the barrel over the upper end of the end wall 2 of the base and through the opening 11 in the end wall of the trough 7 under the beveled rib 12 of said end wall and into the conductor 25. The water is thus conducted from the barrel through the flexible hose into the conductor and through its perforation into the tank 18, which becoming filled overflows through the opening 20 into the trough 7. The weight at the end of the trough is sufficient to elevate the trough and tank when both are empty; but when sufficient water has overflowed from the tank to fill the trough and thus both trough and tank are filled, the weight is overbalanced and the longer end of the trough depressed. As the trough descends, the transverse beveled rib 12 compresses the flexible hose or pipe upon the upper edge of the end wall of the base, and thus cuts off the supply of water to the tank and trough until sufficient water has been taken from either to permit them to be counterbalanced by the weight when communication is opened between the supply and the tank and trough and the latter are refilled.

From the above it is apparent that I provide a cheap and simply-constructed trough adapted for various kinds of stock and one in which the water is automatically admitted and cut off.

Having described my invention, what I claim is—

1. The combination, with the base terminating at one end in a vertical wall, of a trough fulcrumed upon the base and terminating at one end in a vertical wall extending above that of the base, provided with an opening and a transverse beveled rib above the same and over the upper end of the vertical wall of the base, a source of supply, a flexible pipe leading from the same between the rib and the end of the vertical wall of the base and to the opening under the rib, a tank supported upon the trough at that side of the fulcrum of the latter at which is located the supply-pipe, said tank being provided with an overflow, and weights located at the opposite end of the trough, substantially as specified.

2. The combination, with the base 1, having the end wall 2, the vertical guide 3 at the inner side of the same, the transverse ribs 5, and fulcrum-pin 6, of the trough 3, having the end wall 10, provided with the opening 11 and above the same with a beveled rib 12, taking over the end wall of the base, the opposite end wall of the trough, the fulcrum-rib upon the under side of the trough fitting loosely between the ribs 5 and having a central recess for the reception of the pin 6 of the base, the weighted frame 16 at the rear end of the trough, the recessed vertical wall at that end, the tank 18, having opposite recesses and an overflow perforation, the grooved conductor seated in the recesses of the tank in the recess of one wall and the opening of the other of the trough, the supply, and the flexible pipe leading from the same to the conductor, substantially as specified.

In testimony that I claim the foregoing as my own I have hereto affixed my signature in presence of two witnesses.

MARTIN N. BROUSE.

Witnesses:
H. W. SALLWASSER,
C. F. McCLUNG.